(12) United States Patent
Cha et al.

(10) Patent No.: US 7,224,416 B2
(45) Date of Patent: May 29, 2007

(54) BACKLIGHT ASSEMBLY USING THE SAME AND LIQUID CRYSTAL DISPLAY DEVICE

(75) Inventors: Guy-Ho Cha, Gyeonggi-do (KR); Jong-Dae Park, Seoul (KR); Se-In Chang, Suwon-si (KR); Seok-Won Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 131 days.

(21) Appl. No.: 10/522,481

(22) PCT Filed: Feb. 20, 2003

(86) PCT No.: PCT/KR03/00349

§ 371 (c)(1),
(2), (4) Date: Jan. 26, 2005

(87) PCT Pub. No.: WO2004/011997

PCT Pub. Date: Feb. 5, 2004

(65) Prior Publication Data

US 2005/0243238 A1 Nov. 3, 2005

(30) Foreign Application Priority Data

Jul. 26, 2002 (KR) ............................. 2002-44272

(51) Int. Cl.
*G02F 1/1333* (2006.01)
(52) U.S. Cl. .......................... 349/60; 349/58
(58) Field of Classification Search .............. 385/146, 385/147, 901; 349/58, 60
See application file for complete search history.

(56) References Cited

U.S. PATENT DOCUMENTS

| | | | | |
|---|---|---|---|---|
| 5,583,681 A | * | 12/1996 | Shioya et al. | 349/60 |
| 5,808,707 A | * | 9/1998 | Niibori et al. | 349/60 |
| 6,067,133 A | * | 5/2000 | Niibori et al. | 349/60 |
| 6,175,396 B1 | | 1/2001 | Kim et al. | 349/58 |
| 6,409,356 B1 | | 6/2002 | Nishimura | 362/632 |
| 2001/0024248 A1 | | 9/2001 | Kim | 349/58 |
| 2002/0024623 A1 | * | 2/2002 | Kim et al. | 349/58 |

OTHER PUBLICATIONS

International Search Report for International Application No. PCT/KR03/00349 dated Aug. 12, 2003.

* cited by examiner

*Primary Examiner*—Quyen Leung
(74) *Attorney, Agent, or Firm*—Cantor Colburn LLP (57) ABSTRACT

There are provided a backlight assembly (700) and an LCD device (1000) using the same. The backlight assembly (700) has an optical sheet (100) for improving light efficiency and optical properties thereof and an elastic adhesive member (130) disposed on the optical sheet (100). When the optical sheet (100) deforms with heat, the elastic adhesive member (130) may be expanded or contracted corresponding to deformation of the optical sheet (100) and absorb impact applied to LCD device. Accordingly, the backlight assembly (700) may prevent the optical sheet (100) from being wrinkled or scratched, thereby preventing display quality of the LCD device from being deteriorated.

12 Claims, 9 Drawing Sheets

BACKLIGHT ASSEMBLY USING THE SAME AND LIQUID CRYSTAL DISPLAY DEVICE

TECHNICAL FIELD

The present invention relates to a backlight assembly and a liquid crystal display (LCD) device, and more particularly to a backlight assembly capable of preventing an optical sheet from being wrinkled or scratched with heat or impact applied to the optical sheet, thereby preventing display quality from being deteriorated and LCD device having the same.

BACKGROUND ART

In general, an LCD device displays image information using liquid crystal. In order to display image information, an LCD device includes a light supplying part that generates light needed to display image information, an optical part that allows light supplied from the light supplying part to have uniform brightness and a liquid crystal controlling part that controls liquid crystal.

The LCD device employs a CCFL (Cold Cathode Fluorescent Lamp) having characteristics, for example, such as a long life, a white light and a small amount of heat generation as a light supplying part.

The optical part plays a role that makes brightness of light emitted from the CCFL to be uniform. The optical part may include various optical sheets depending on a type of the LCD device.

The optical sheet includes a diffusion sheet that allows brightness distribution of light to be uniform by diffusing light emitted from the CCFL and a prism sheet that collects light diffused by the diffusion sheet.

The optical sheet may include a light guide plate. Light guide plate changes optical property, for example, such as linearity of light emitted from the CCFL into a form of surface light.

The liquid crystal controlling part controls liquid crystal in a unit of pixel so as to control transmittance of light processed in the optical part, thereby displaying image information.

The light supplying part, the optical part and the liquid crystal controlling part play important roles in a display operation of the LCD device. Especially, the optical part has remarkable influence upon display quality of image information.

The diffusion sheet and the prism sheet of the optical part are fixed to a frame of the LCD device using a double sided tape or a hole formed thereon and a boss formed at the frame of the LCD device.

However, the optical part may be easily expanded with heat because the optical part is fabricated with a thin sheet made of synthetic resin. Particularly, in case that the optical part securely fixed to the frame by double sided tape is expanded, the optical part may be easily wrinkled because there is no extra space in the frame of the LCD device. As a result, image information may not be normally displayed on a screen.

For this reason, a method that allows the optical part received in the frame of the LCD device to be moved has been used in this age. However, in case of fixing the optical part to the frame such that it may be moved in the frame, the optical part may collide with the liquid crystal controlling part adjacent to the optical part when impact is applied to the frame of the LCD device. As a result, the optical part and the liquid crystal controlling part may be fatally damaged by scratch therebetween so that display quality is deteriorated.

DISCLOSURE OF THE INVENTION

Accordingly, the present invention has been devised to solve the foregoing problems of the conventional art, and it is a first object of the present invention to provide a backlight assembly capable of preventing an optical sheet from being wrinkled or scratched with heat or impact applied to the optical sheet.

It is a second object of the present invention to provide an LCD device capable of preventing an optical sheet from being wrinkled or scratched with heat or impact applied to the optical sheet.

To accomplish the first object, there is provided a backlight assembly comprising: a first receiving container having a bottom surface and a sidewall extended from edges of the bottom surface so as to provide a receiving space; an optical module including a lamp for generating a first light and a first optical member for generating a second light having brightness more uniform than that of the first light; a second optical member including a body for generating a third light by controlling optical characteristics of the second light and at least one fixing portion protruded from edges of the body toward the first receiving container and coupled to the sidewall; a second receiving container combined with the sidewall of the first receiving container, for covering the fixing portion; and an elastic adhesive member disposed between the fixing portion and the second receiving container, for absorbing impact applied from an exterior.

To accomplish the second object, there is provided an LCD device comprising: a first receiving container having a bottom surface and a sidewall extended from edges of the bottom surface so as to provide a receiving space; an optical module including a lamp for generating a first light and a first optical member for generating a second light having brightness more uniform than that of the first light; a second optical member including a body for generating a third light by controlling optical characteristics of the second light and at least one fixing portion protruded from edges of the body toward the first receiving container and coupled to the sidewall; a second receiving container combined with the sidewall of the first receiving container, for covering the fixing portion; an elastic adhesive member disposed between the fixing portion and the second receiving container, for absorbing impact applied from an exterior; a liquid crystal display panel disposed on the second optical member, for changing the third light emitted from the second optical member into light having image information; and a chassis for fixing the liquid crystal display panel.

According to the present invention, the optical member is adhered to the receiving container using the elastic adhesive member that is flexible corresponding to deformation of the optical member with heat and absorbs impact applied to the LCD device, thereby preventing the optical sheet from being wrinkled or scratched.

BRIEF DESCRIPTION OF THE DRAWINGS

The above objects and other advantages of the present invention will become more apparently by describing in detail the exemplary embodiments thereof with reference to the accompanying drawings, in which.

BEST MODE FOR CARRYING OUT THE INVENTION

<Embodiment 1>

Figure 1:
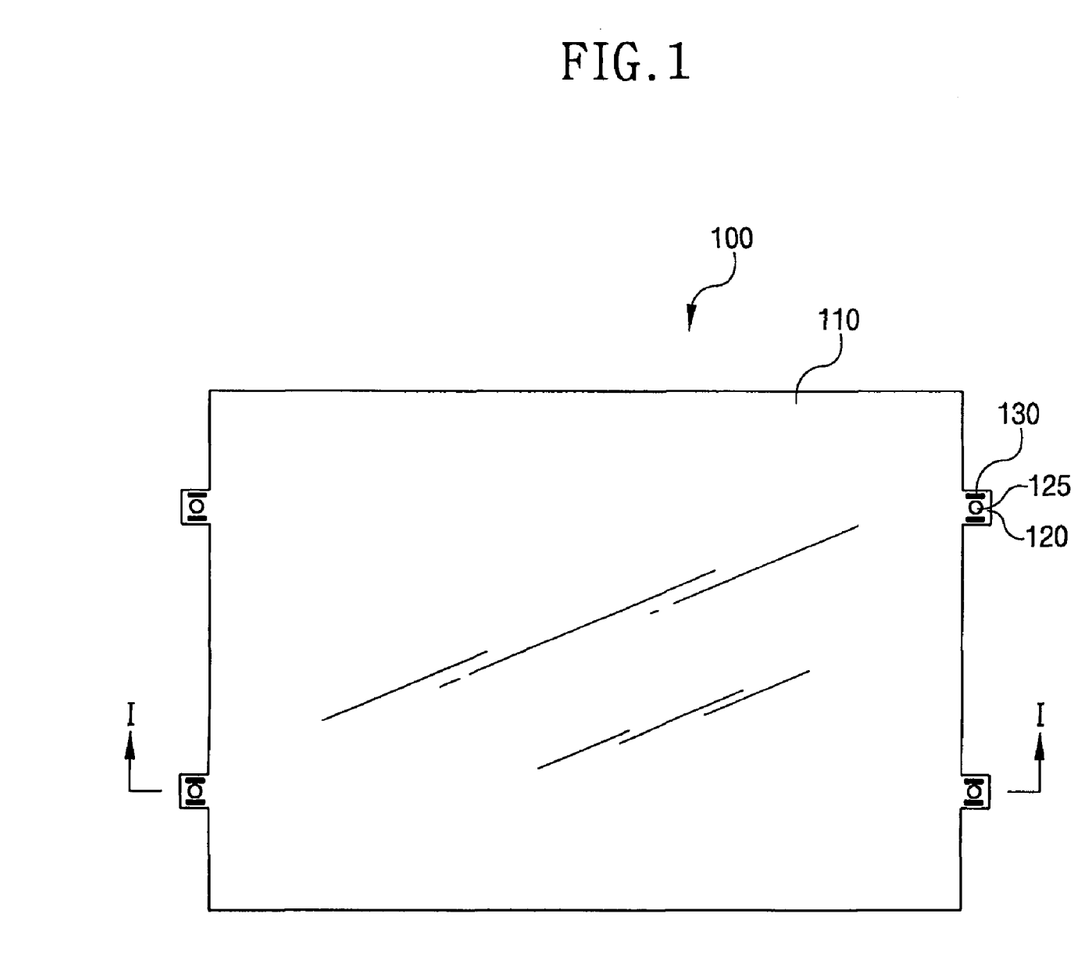
FIG. 1 is a plane view showing an optical sheet according to a first exemplary embodiment of the present invention.

FIG. 1 is a plane view showing an optical sheet according to a first exemplary embodiment of the present invention.

Referring to FIG. 1, an optical sheet 100 is disposed between a light source and an LCD panel. The optical sheet 100 controls optical properties of light emitted from the light source and supplies the light to the LCD panel. The LCD panel can display image information having superior image quality by using functions of the optical sheet 100 as described above.

Display devices using liquid crystal, in general, employ at least one optical sheet 100 having various optical characteristics needed to display image information.

The optical sheet 100 is formed in a shape of thin plate so as to minimize thickness of an LCD device. The optical sheet 100 has a size corresponding to that of the LCD panel and a shape similar to that of the LCD panel.

As shown in FIG. 1, the optical sheet 100 has a rectangular shape. The optical sheet 100 according to the first exemplary embodiment of the present invention includes an optical sheet body 110, an optical sheet body fixing portion 120 and an elastic adhesive member 130.

The optical sheet body 110 has the majority of area of the optical sheet 100 and changes optical properties of light emitted from the light source.

The optical sheet body fixing portion 120 is partially extended from edges of the optical sheet body 110 in a direction parallel to the optical sheet body 110. The optical sheet body fixing portion 120 is positioned at four places of the optical sheet body 110 and each optical sheet body fixing portion 120 is provided with a fixing hole 125.

The fixing hole 125 is coupled to a boss (not shown) so as to prevent the optical sheet body 110 from being separated from a predetermined position. In general, the optical sheet 100 is easily expanded when heat is applied thereto and static electricity is easily generated while controlling the optical properties of image information because the optical sheet 100 is fabricated by synthetic resin.

In case that the optical sheet body 110 is expanded with heat applied thereto, wrinkles may be generated over the optical sheet 100, thereby rapidly deteriorating display quality of image information.

In order to prevent the wrinkles from being generated, an elastic range of the optical sheet 100 needs to be considered before the optical sheet body 110 is fixed to another member.

Particularly, the fixing hole 125 of the optical sheet body fixing portion 120 has a size larger than that of the boss (not shown) so that the optical sheet 100 can move after the fixing hole 125 is coupled to the boss.

However, if the optical sheet 100 is fixed to the LCD device by coupling the fixing hole 125 to the boss such that it may be moved, the optical sheet 100 can be terribly moved by impact applied from an exterior.

The optical sheet 100 collides with an LCD panel disposed adjacent to the optical sheet 100 while moving by the impact applied thereto. As a result, the optical sheet 100 and the LCD panel may be damaged, for example, such as scratch that causes deterioration of display quality.

The elastic adhesive member 130 plays a role for preventing the optical sheet 100 from being scratched and wrinkled.

Figure 2:
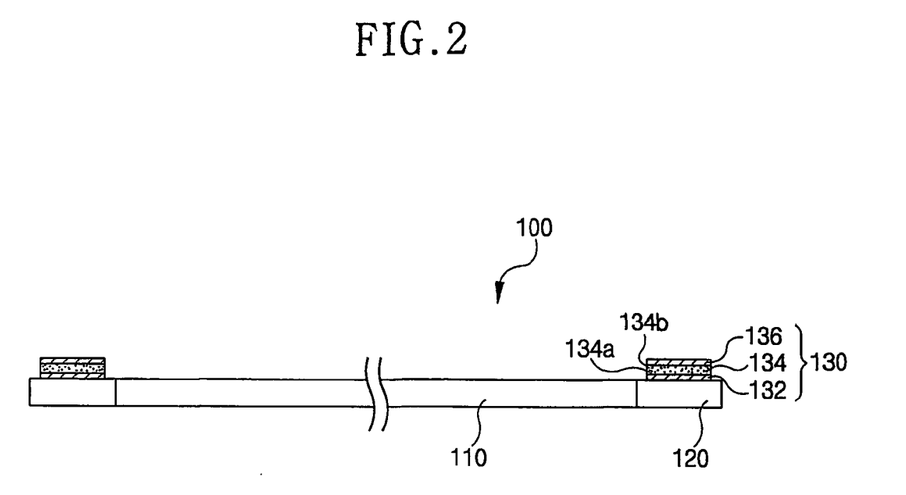
FIG. 2 is a sectional view taken along the line I—I showing an elastic adhesive member according to a first exemplary embodiment of the present invention.

FIG. 2 is a sectional view taken along the line I—I showing an elastic adhesive member according to a first exemplary embodiment of the present invention.

Referring to FIG. 2, the elastic adhesive member 130 includes three layers and outwardly has a rectangular shape.

The elastic adhesive member 130 includes a flexible foamed resin layer 134, a first adhesive layer 132 formed on a first surface 134a of the foamed resin layer 134 and a second adhesive layer 136 formed on a second surface 134b of the foamed resin layer 134.

The foamed resin layer 134 is formed in a form of thin layer by mixing and stirring synthetic resin with foaming agent that generates bubbles. The foamed resin layer 134 may be freely elastic in a predetermined range since the foamed resin layer 134 has superior elasticity. Thus, the foamed resin layer 134 can absorb impact applied from the exterior.

The first adhesive layer 132 is adhered to the optical sheet body fixing portion 120 and the second adhesive layer 136 is adhered to another member in opposition to the optical sheet body fixing portion 120.

The first and second adhesive layers 132 and 136 have adhesive force different to or same to each other.

For example, if the adhesive force of the second adhesive layer 136 is stronger than that of the first adhesive layer 132, the second adhesive layer 136 can be expanded in a direction corresponding to a direction to which the optical sheet 100 is expanded, thereby preventing the optical sheet 100 from being wrinkled.

The elastic adhesive member 130, as shown in FIG. 1, may be disposed at both sides of the fixing hole 125 of the optical sheet body fixing portion 120.

Figure 3:
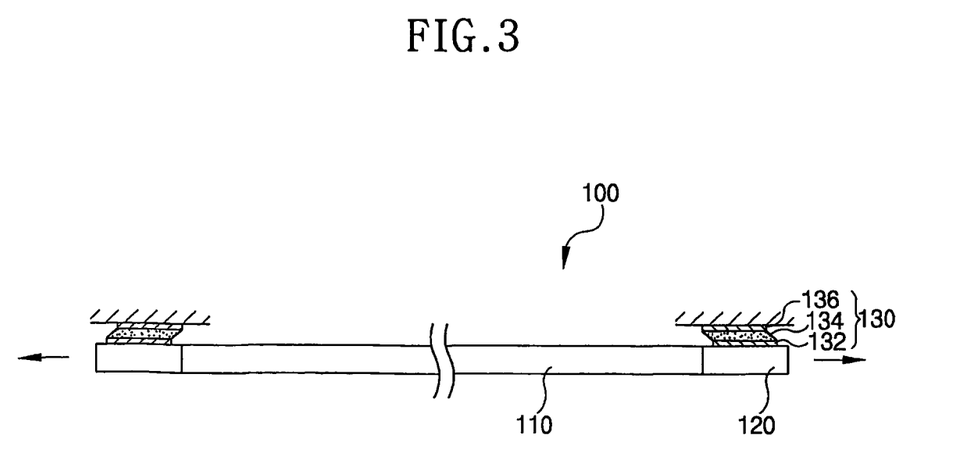
FIG. 3 is a sectional view for illustrating functions of an elastic adhesive member according to a first exemplary embodiment of the present invention.

FIG. 3 is a sectional view for illustrating functions of an elastic adhesive member according to a first exemplary embodiment of the present invention.

Referring to FIG. 3, the optical sheet 100 is expanded from center portion of the optical sheet body 110 toward the optical sheet body fixing portion 120 according as the optical sheet 100 is expanded with heat.

Since the optical sheet 100 is adhered to the first and the second adhesive layers 132 and 136 of the elastic adhesive member 130, an expansive force of the optical sheet 100 is transmitted to the elastic adhesive member 130.

The foamed resin layer 134 of the elastic adhesive member 130 relatively moves with respect to the first and the second adhesive layers 132 and 136. That is, the foamed resin layer 134 is expanded or contracted by an expanded length of the optical sheet 100 so as to prevent the wrinkle of the optical sheet 100 from being generated.

Also, the foamed resin layer 134 of the elastic adhesive member 130 may absorb the impact applied from the exterior, so that the LCD panel may prevent the scratch that affects display quality thereof from being generated.

<Embodiment 2>

Figure 4:
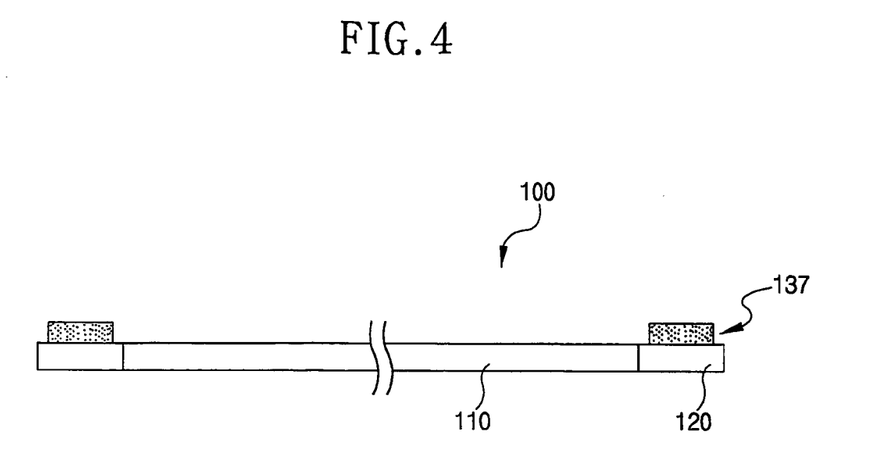
FIG. 4 is a sectional view showing an optical sheet according to a second exemplary embodiment of the present invention.

FIG. 4 is a sectional view showing an optical sheet according to a second exemplary embodiment of the present invention. In this exemplary embodiment, an elastic adhesive member of the optical sheet according to the second exemplary embodiment will be described and parts of the optical sheet according to the second exemplary having structures same to that of the optical sheet according to the first exemplary embodiment will be omitted.

Referring to FIG. 4, an elastic adhesive member 137 is comprised of an adherent foamed resin that a foamed resin is mixed with an adhesive. Thus, the adherent foamed resin has characteristics, for example, such as flexibility, elasticity, adhesivity, etc., so that the elastic adhesive member 137 may be freely expanded or contracted.

Figure 5:
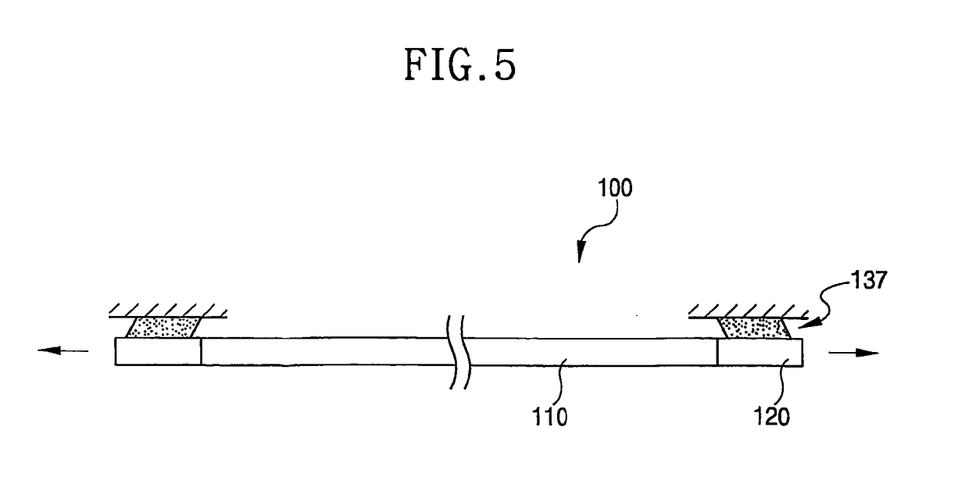
FIG. 5 is a sectional view for illustrating functions of an optical sheet according to a second exemplary embodiment of the present invention.

FIG. 5 is a sectional view for illustrating functions of an optical sheet according to a second exemplary embodiment of the present invention.

Referring to FIG. 5, the optical sheet 100 is expanded from a center portion of the optical sheet body 110 toward the optical sheet body fixing portion 120 with heat applied thereto.

The expansive force of the optical sheet 100 is transmitted to the elastic adhesive member 137 because the optical sheet 100 is adhered to the elastic adhesive member 137.

The elastic adhesive member 137 is expanded or contracted by an expanded length of the optical sheet 100 so as to prevent the wrinkle of the optical sheet 100 from being generated.

Also, the foamed resin layer 134 of the elastic adhesive member 130 may absorb the impact applied from the exterior, so that the LCD panel may prevent the scratch that affects display quality thereof from being generated.

The elastic adhesive member 137 according to the second exemplary embodiment has a thickness thinner than that of the elastic adhesive member 130 according to the first exemplary embodiment.

In addition, the elastic adhesive member 137 according to the second exemplary embodiment may be formed through a simplified process as compared with a process needed to form the elastic adhesive member 130 having the first and the second adhesive layers 132 and 136 according to the first exemplary embodiment.

<Embodiment 3>

Figure 6:
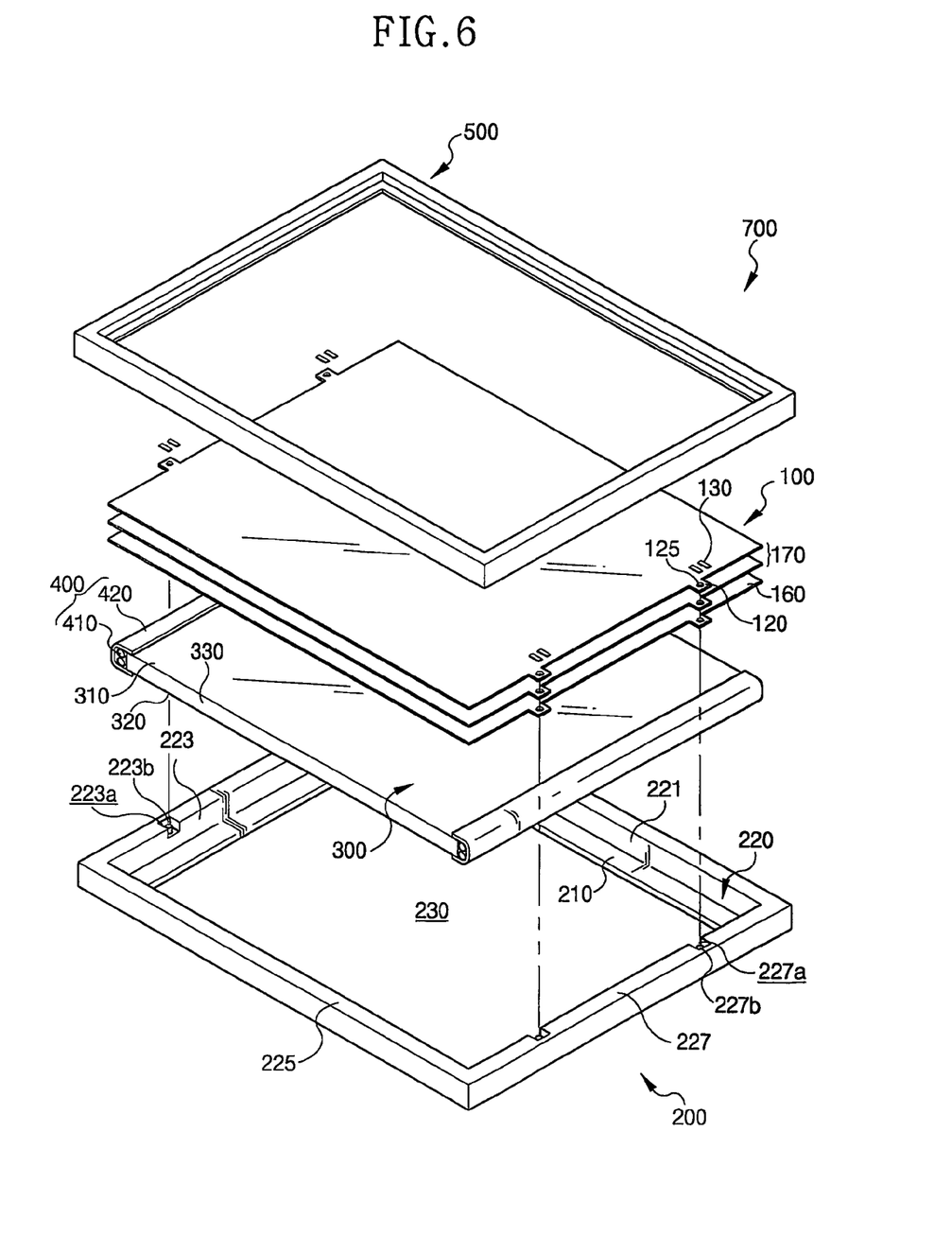
FIG. 6 is an exploded perspective view showing a backlight assembly according to a third exemplary embodiment of the present invention.
Figure 7:
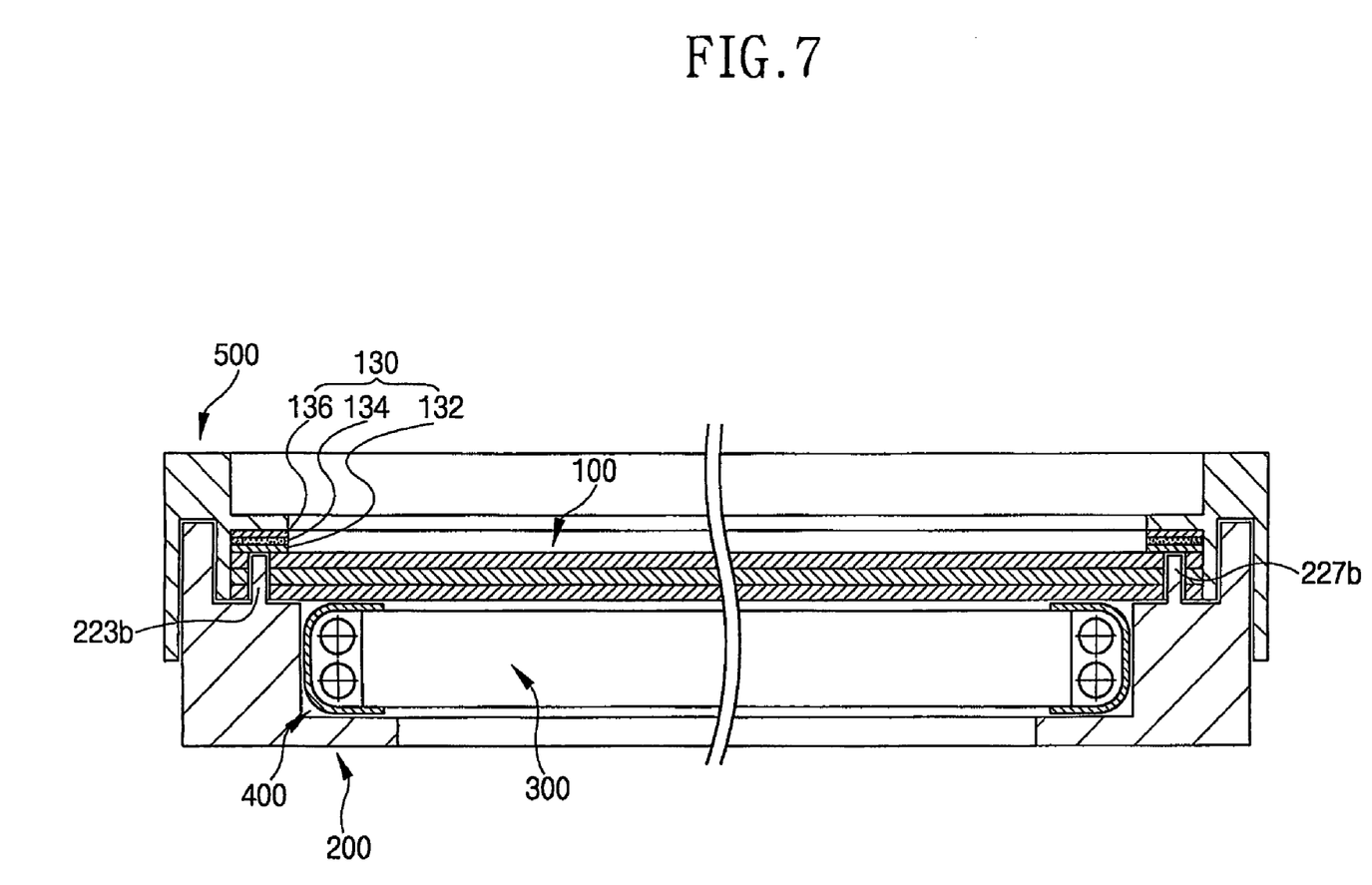
FIG. 7 is a sectional view showing an assembled structure of a backlight assembly shown in FIG. 6.

FIG. 6 is an exploded perspective view showing a backlight assembly according to a third exemplary embodiment of the present invention. FIG. 7 is a sectional view showing an assembled structure of a backlight assembly shown in FIG. 6.

Referring to FIGS. 6 and 7, a backlight assembly 700 includes a first receiving container 200, a light guide plate 300, a lamp assembly 400, an optical sheet 100 and a second receiving container 500.

The first receiving container 200 includes a bottom surface having a rectangular shape and sidewalls 221, 223, 225 and 227 extended from edges of the bottom surface 210, thereby providing a receiving space 230.

Two sidewalls 223 and 227 facing to each other of the sidewalls 221, 223, 225 and 227 are provided with two optical sheet receiving recesses 223a and 227a, respectively. The optical sheet receiving recesses 223a and 227a are disposed on the sidewalls 223 and 227 such that the optical sheet receiving recesses 223a and 227a are partially opened in association with the receiving space 230.

The optical sheet receiving recesses 223a and 227a are provided with bosses 223b and 227b, respectively.

The light guide plate 300 and the lamp assembly 400 are received in the receiving space 230 of the first receiving container 200.

The lamp assembly 400 includes a lamp 410 for generating a first light and a lamp reflector 420.

The lamp 410 includes a CCFL so as to generate the first light having a linear light distribution.

The CCFL 410 has advantageous, for example, such as a long life, a white light and a small amount of heat generation as compared with an incandescent lamp.

The lamp reflector 420 reflects the first light radially generated from the CCFL 410 to the light guide plate 300.

For this purpose, the lamp reflector 420 is separated from the CCFL 410 in a predetermined distance and partially opened in order to reflect the first light to the light guide plate 300 while outwardly covering the CCFL 410.

The light guide plate 300 has a rectangular shape. The light guide plate 300 receives the first light having the linear light distribution from the lamp assembly 400 and emits a second light having a surface light distribution.

In order to emit the second light having the surface light distribution, the light guide plate 300 includes four sidewalls 330, a light emitting surface 310 connected to the four sidewalls 330, and a light reflecting surface 320 opposite to the light emitting surface 310 and connected to the four sidewalls 330.

The light guide plate 300 receives the first light emitted from the CCFL 410 through the sidewalls 330 and emits the second light that is reflected or transmitted based on refraction law through the light emitting surface 310.

In order to change the first light into the second light and emit the second light through the light emitting surface 310, the lamp assembly 400 is disposed adjacent to the sidewalls 330 of the light guide plate 300.

The second light emitted from the light emitting surface 310 of the light guide plate 300 has an inclination angle which is more inclined than that of an axis perpendicular to the light emitting surface 310. This second light is difficult to use for display.

The optical sheet 100 is disposed on the light emitting surface 310 of the light guide plate 300 so as to change a direction of the second light emitted from the light emitting surface 310 of the light guide plate 300 and improve brightness uniformity thereof.

The optical sheet 100 includes at least one optical sheet, preferably, three optical sheets.

More preferably, the optical sheet 100 includes a diffusing sheet 160 and two prism sheets 170.

The diffusing sheet 160 diffuses the second light emitted from the light emitting surface 310 of the light guide plate 300 so as to emit a third light into which the direction of the second light is changed.

The prism sheets 170 change the direction of the third light into which the direction of the third light is changed by the diffusing sheet 160 such that the majority of third light is emitted in a direction perpendicular to the light emitting surface 310 of the light guide plate 300.

The optical sheet 100 having the diffusing sheet 160 and the prism sheets 170 include the optical sheet body 110, the optical sheet body fixing portion 120 and the elastic adhesive member 130.

The optical sheet body fixing portion 120 is provided with the fixing hole 125 and the optical sheet body fixing portion 120 is received in the first receiving container 200.

In detail, the optical sheet body fixing portion 120 is coupled to the bosses 223b and 227b formed at the optical sheet receiving recesses 223a and 227a of the first receiving container 200 and fixed thereto.

The elastic adhesive member 130 is disposed at each optical sheet body fixing portion 120. As shown in FIG. 2, the elastic adhesive member 130 includes a flexible foamed resin layer 134, a first adhesive layer 132 formed on a first surface 134a of the foamed resin layer 134 and a second adhesive layer 136 formed on a second surface 134b of the foamed resin layer 134.

The elastic adhesive member 130 may be disposed between the optical sheet 100 and an adjacent optical sheet.

Referring to FIG. 2, the foamed resin layer 134 is formed in the form of thin layer by mixing and stirring synthetic resin with foaming agent that generates bubbles. The foamed resin layer 134 may be freely elastic in a predetermined range since the foamed resin layer 134 has superior elasticity. Thus, the foamed resin layer 134 can absorb impact applied from the exterior.

The first adhesive layer 132 is adhered to the optical sheet body fixing portion 120 and the second adhesive layer 136 is adhered to the second receiving container 500 in opposition to the optical sheet body fixing portion 120.

As shown in FIG. 4, the elastic adhesive member 137 may be comprised of the adherent foamed resin that a foamed resin is mixed with an adhesive. Thus, the adherent foamed resin has characteristics, for example, such as flexibility, elasticity, adhesivity, etc., so that the elastic adhesive member 137 may be freely expanded or contracted.

The second receiving container 500 is combined with the first receiving container 200 in order to prevent the lamp assembly 400, the light guide plate 300, the optical sheet 100 and the LCD panel assembly sequentially received in the first receiving container 200 from being separated from the first receiving container 200.

For this purpose, the second receiving container 500 has a frame shape of which a center portion thereof is opened.

When the second receiving container 500 is combined with the first receiving container 200, the second receiving container 500 is partially adhered to the second adhesive layer 136 of the elastic adhesive member 130 shown in FIG. 2.

Referring to FIG. 7, the second adhesive layer 136 of the elastic adhesive member 130 is adhered to the second receiving container 500.

<Embodiment 4>

Figure 8:
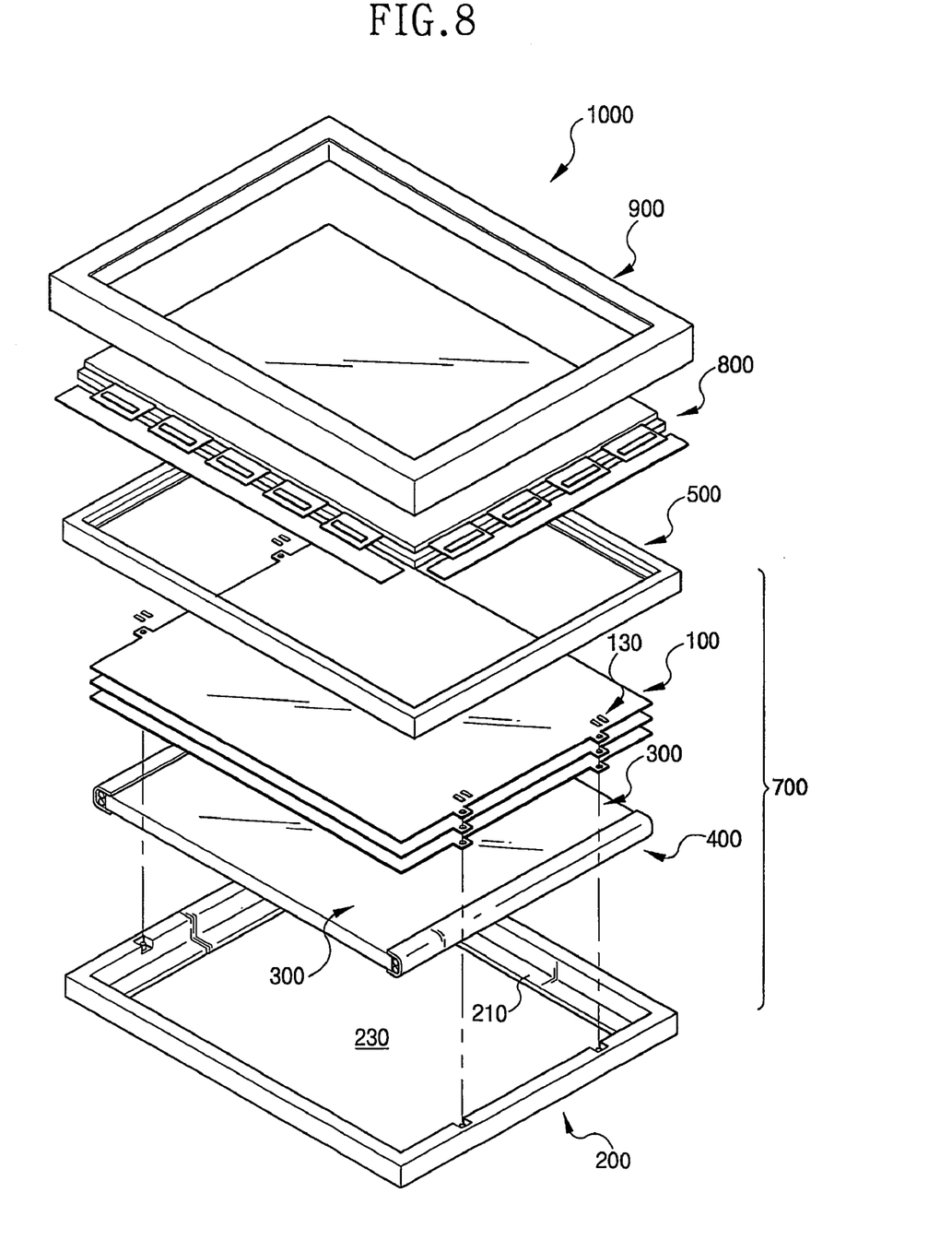
FIG. 8 is an exploded perspective view showing an LCD device according to a fourth exemplary embodiment of the present invention.
Figure 9:
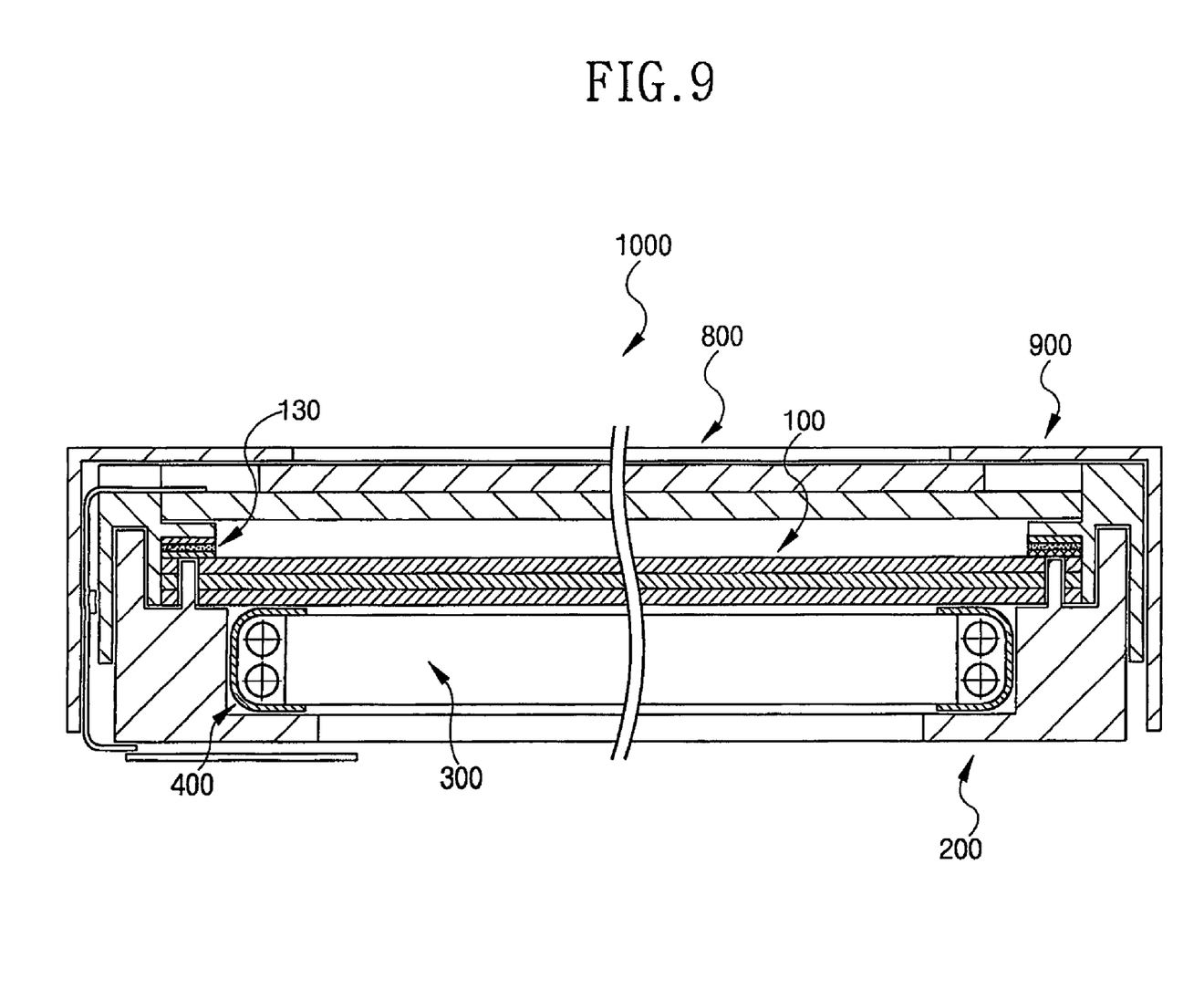
FIG. 9 is a sectional view showing an assembled structure of an LCD device shown in FIG. 8.

FIG. 8 is an exploded perspective view showing an LCD device according to a fourth exemplary embodiment of the present invention. FIG. 9 is a sectional view showing an assembled structure of an LCD device shown in FIG. 8.

In this exemplary embodiment, the LCD device according to the fourth exemplary embodiment will be described and a backlight assembly of the LCD device according to the fourth exemplary having structures same to that of the first to third exemplary embodiments will be omitted.

Referring to FIGS. 8 and 9, an LCD device 1000 includes a backlight assembly 700, an LCD panel assembly 800 and a chassis 900.

Figure 10:
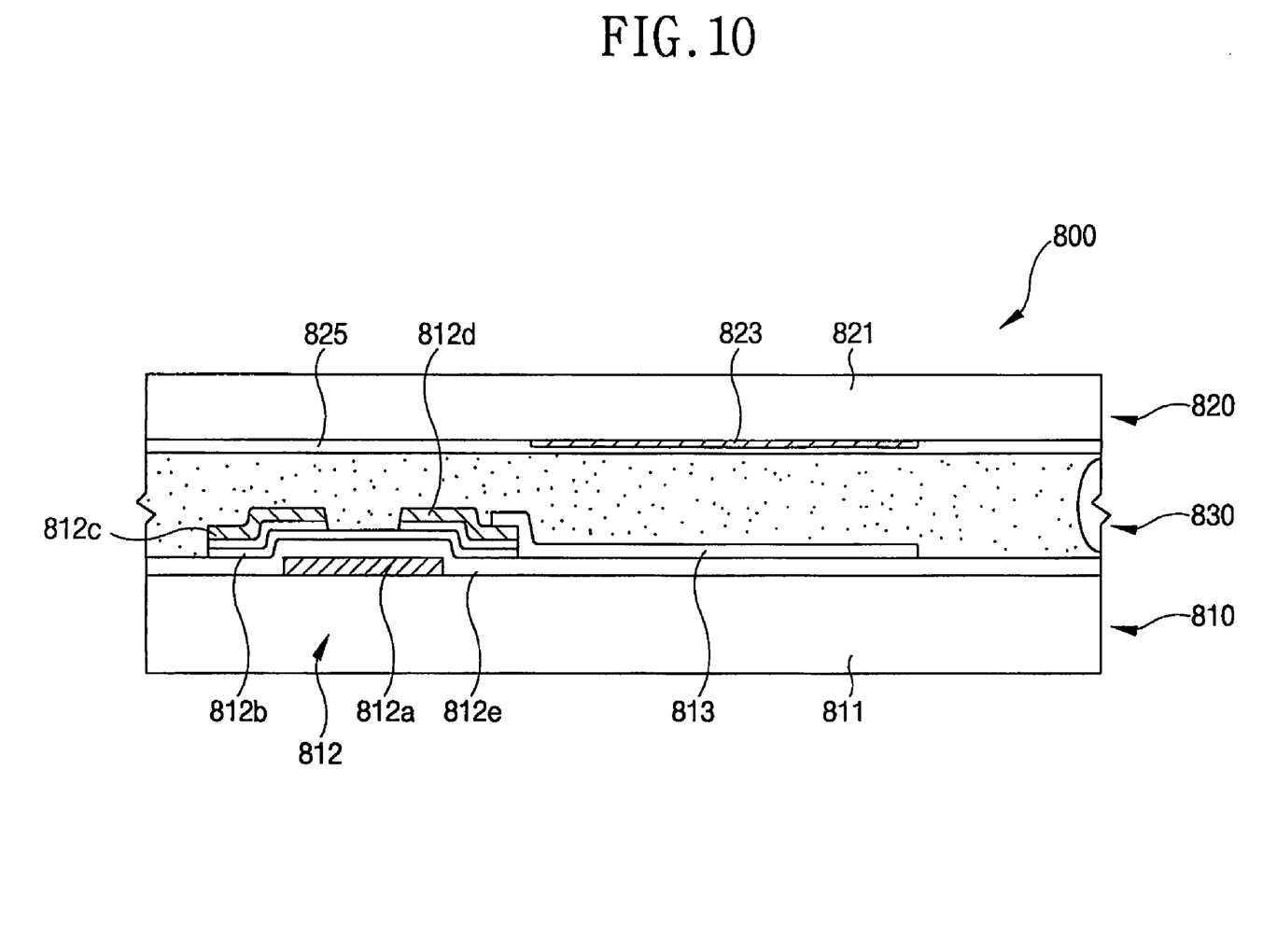
FIG. 10 is a sectional view showing an LCD panel of an LCD device shown in FIG. 8.
Figure 11:
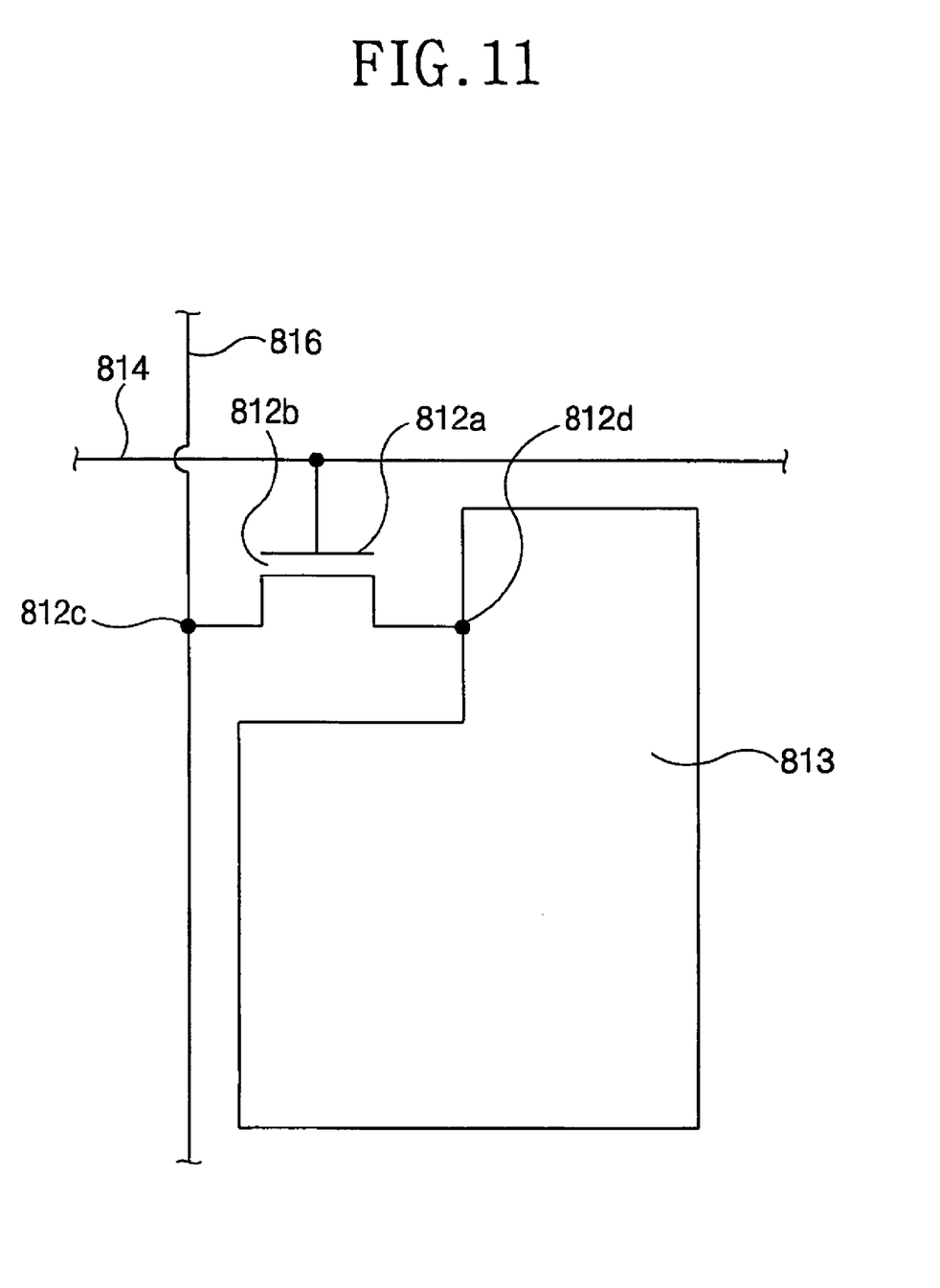
FIG. 11 is a schematic circuit diagram showing a TFT substrate.

FIG. 10 is a sectional view showing an LCD panel of an LCD device shown in FIG. 8. FIG. 11 is a schematic circuit diagram showing a TFT substrate.

Referring to FIGS. 10 and 11, the LCD panel assembly 800 includes a TFT substrate 810, a color filter substrate 820 and a liquid crystal 830.

The TFT substrate 810 includes a first transparent substrate 811, a TFT 812 and a pixel electrode 813.

The TFT 812 is formed on the first transparent substrate 811 in a matrix configuration by thin film fabricating process.

The TFT 812 includes a gate electrode 812a, a channel layer 812b, a source electrode 812c and a drain electrode 812d. The gate electrode 812a and the channel layer 812b are insulated from each other by an insulating layer 812e. The channel layer 812b is disposed on the insulating layer 812e corresponding to the gate electrode 812a so that the channel layer 812b may be insulated from the gate electrode 812a.

The gate electrode 812a of the TFT 812 is connected to a gate line 813 shown in FIG. 11 and the source electrode 812c is connected to a data line 816 shown in FIG. 11.

The pixel electrode 813 is connected to the drain electrode 812d of the TFT 812. The pixel electrode 813 is comprised of transparent conductive material, for example, such as ITO (Indium Tin Oxide) or IZO (Indium Zinc Oxide).

Referring to FIG. 10, the color filter substrate 820 includes a second transparent substrate 821, a color filter 823 and a common electrode 825.

The color filter 823 is disposed on the second transparent substrate 821 in the matrix configuration by thin film fabricating process. The color filter 823 is positioned facing to the pixel electrode 813 disposed on the TFT substrate 810. The common electrode 825 is disposed over the second transparent substrate 821 so as to allow the color filter 823 to be covered thereby.

The liquid crystal is injected between the TFT substrate 810 and the color filter substrate 820 after the TFT substrate 810 is combined with the color filter substrate 820, thereby completing the LCD device 1000.

Referring to FIG. 9, when the LCD panel assembly 800 is received in the second receiving container 500, the chassis 900 is combined with the first receiving container 200 by using hook portions thereof while pressurizing edges of the LCD panel assembly 800.

INDUSTRIAL APPLICABILITY

As aforementioned above, the backlight assembly and the LCD device may prevent the optical sheet from being wrinkled when the optical sheet is expanded with heat, thereby preventing the display quality from being deteriorated.

Also, the backlight assembly and the LCD device may prevent the optical sheet from colliding with the LCD panel when impacted, so that it may prevent the optical sheet from being scratched and the display quality from being deteriorated.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

The invention claimed is:

1. A backlight assembly comprising:
   a first receiving container having a bottom surface and a sidewall extended from edge of the bottom surface so as to provide a receiving space;
   an optical module including a lamp for generating a first light and a first optical member for generating a second light having brightness more uniform than that of the first light;
   a second optical member including a body for generating a third light by controlling optical characteristics of the second light and at least one fixing portion protruded from edges of the body toward the first receiving container and coupled to the sidewall;
   a second receiving container combined with the sidewall of the first receiving container, for covering the fixing portion; and
   an elastic adhesive member disposed between the fixing portion of the second optical member and the second receiving container, the elastic adhesive member absorbing impact applied from an exterior and being expanded or contracted by a predetermined length corresponding to an expansion of the second optical member to prevent a wrinkle of the second optical member.

2. The backlight assembly of claim 1, wherein the elastic adhesive member comprises foamed resin and adhesive material coated on both sides of the foamed resin.

3. The backlight assembly of claim 1, wherein the elastic adhesive member comprises foamed resin having adhesive material.

4. The backlight assembly of claim 1, wherein a first adhesive force between the second receiving container and the elastic adhesive member is greater than a second adhesive force between the second optical member and the elastic adhesive member.

5. The backlight assembly of claim 1, wherein a first adhesive force between the second receiving container and the elastic adhesive member is smaller than a second adhesive force between the second optical member and the elastic adhesive member.

6. The backlight assembly of claim 1, wherein the fixing portion comprises a fixing hole formed therethrough and the first receiving container comprises a fixing boss inserted into the fixing hole.

7. The backlight assembly of claim 6, wherein the fixing boss has a diameter smaller than a diameter of the fixing hole.

8. The backlight assembly of claim 6, wherein the elastic adhesive member is disposed at both portions of the fixing hole.

9. A liquid crystal display device comprising:
   a first receiving container having a bottom surface and a sidewall extended from edge of the bottom surface so as to provide a receiving space;
   an optical module including a lamp for generating a first light and a first optical member for generating a second light having brightness more uniform than that of the first light;
   a second optical member including a body for generating a third light by controlling optical characteristics of the second light and at least one fixing portion protruded from edges of the body toward the first receiving container and coupled to the sidewall;
   a second receiving container combined with the sidewall of the first receiving container, for covering the fixing portion;
   an elastic adhesive member disposed between the fixing portion of the second optical member and the second receiving container, for the elastic adhesive member absorbing impact applied from an exterior and being expanded or contracted by a predetermined length corresponding to an expansion of the second optical member to prevent a wrinkle of the second optical member;
   a liquid crystal display panel disposed on the second optical member, for changing the third light emitted from the second optical member into light having image information; and
   a chassis for fixing the liquid crystal display panel.

10. The liquid crystal display device of claim 9, wherein the elastic adhesive member comprises foamed resin and adhesive material coated on both sides of the foamed resin.

11. The liquid crystal display device of claim 9, wherein the elastic adhesive member comprises foamed resin having adhesive material.

12. The liquid crystal display device of claim 9, wherein the second optical member comprises at least two second optical members and two second optical members comprises the elastic adhesive member disposed therebetween.

* * * * *